United States Patent [19]
Hsieh et al.

[11] Patent Number: 6,015,475
[45] Date of Patent: Jan. 18, 2000

[54] POLYURETHANE SEALANT COMPOSITIONS

[75] Inventors: Harry W. Hsieh, Troy; Syed Z. Mahdi, Rochester Hills, both of Mich.

[73] Assignee: Essex Specialty Products, Inc., Auburn Hills, Mich.

[21] Appl. No.: 09/129,856

[22] Filed: Aug. 6, 1998

Related U.S. Application Data

[62] Division of application No. 08/790,635, Jan. 29, 1997, Pat. No. 5,852,137.

[51] Int. Cl.$^7$ ........................................................ C09J 4/00
[52] U.S. Cl. ..................................... 156/331.4; 156/331.1; 528/53; 528/54; 528/58
[58] Field of Search ................................. 528/53, 54, 58; 156/331.1, 331.4

[56] References Cited

U.S. PATENT DOCUMENTS

| | | | |
|---|---|---|---|
| 3,502,704 | 3/1970 | McKellar | 260/448.8 |
| 3,627,722 | 12/1971 | Selter | 260/37 |
| 3,707,521 | 12/1972 | De Santis | 260/37 |
| 3,779,794 | 12/1973 | De Santis | 117/72 |
| 3,886,226 | 5/1975 | Asai et al. | 260/77.5 |
| 4,284,751 | 8/1981 | Hatt | 528/45 |
| 4,345,053 | 8/1982 | Rizk et al. | 525/440 |
| 4,374,237 | 2/1983 | Berger et al. | 528/28 |
| 4,419,513 | 12/1983 | Breidenbach et al. | 544/222 |
| 4,539,345 | 9/1985 | Hansen | 523/219 |
| 4,555,561 | 11/1985 | Sugimori | 528/26 |
| 4,625,012 | 11/1986 | Rizk et al. | 528/28 |
| 4,640,969 | 2/1987 | Goel et al. | 528/73 |
| 4,643,794 | 2/1987 | Saracsan et al. | 156/310 |
| 4,681,926 | 7/1987 | Goel | 528/48 |
| 4,687,533 | 8/1987 | Rizk et al. | 156/307 |
| 4,758,648 | 7/1988 | Rizk et al. | 528/53 |
| 4,780,520 | 10/1988 | Rizk et al. | 528/53 |
| 5,063,269 | 11/1991 | Hung | 524/296 |
| 5,086,151 | 2/1992 | Ito et al. | 528/53 |
| 5,110,892 | 5/1992 | Graham | 528/48 |
| 5,206,200 | 4/1993 | Bush et al. | 502/167 |
| 5,288,839 | 2/1994 | Greco | 528/204 |
| 5,302,303 | 4/1994 | Clatty et al. | 252/6.5 |
| 5,342,867 | 8/1994 | Ryan et al. | 524/101 |
| 5,409,961 | 4/1995 | Green | 521/78 |
| 5,489,618 | 2/1996 | Gerkin | 521/128 |
| 5,623,044 | 4/1997 | Chiao | 528/28 |

Primary Examiner—Patricia A. Short
Attorney, Agent, or Firm—Norman L. Sims

[57] ABSTRACT

In one aspect, this invention is a polyurethane sealant composition comprising (1) a urethane prepolymer having an isocyanate functionality of at least about 2.0 and a weight average molecular weight of at least about 2,000; and (2) a catalytic amount of (a) a substantially active hydrogen free glycol acid salt of a tertiary amine and an organo metallic compound, (b) a mixture of a substantially active hydrogen free glycol acid salt of a tertiary amine and an organo metallic compound and a second organometallic compound, or (c) a mixture of an organometallic compound with dimorpholinodialkyl ether or an dialkylmorpholinodialkyl ether. In another embodiment, the polyurethane sealant composition further comprises (A) a silane, or (B) an adduct of an isocyanate reactive silane and a polyisocyanate, (C) the reaction product of an isocyanate reactive silane or an adduct of an isocyanate reactive silane and a polyisocyanate with a polyisocyanate and an active hydrogen containing compound or a polyurethane prepolymer which has free isocyanate moieties; which reaction product has an average of at least one silane group and at least one isocyanate group per molecule. In another embodiment the invention is a method for bonding glass to a substrate which comprises contacting a sealant according to the invention with glass and another substrate with the sealant disposed between the glass and substrate and thereafter allowing the sealant to cure so as to bind the glass to the substrate. The sealant composition of the invention is useful in bonding glass substrates to metal plastic, fiberglass or composite substrates, which may or may not be painted. It has been discovered to give unexpectedly high lap shear strength when no primer compositions have previously been applied to the painted plastic, metal, fiberglass or composite substrate.

17 Claims, No Drawings

POLYURETHANE SEALANT COMPOSITIONS

This application is a Divisional of prior application Ser. No. 08/790,635, now U.S. Pat. No. 5,852,137 Jan. 29, 1997.

BACKGROUND OF THE INVENTION

This invention relates to polyurethane sealant compositions which are capable of being used without the need for a primer.

Polyurethane sealant compositions typically comprise at least one urethane prepolymer. Sealants useful for bonding to non-porous substrates, such as glass are described, for example, in U.S. Pat. No. 4,374,237 and U.S. Pat. No. 4,687,533, both incorporated herein by reference. U.S. Pat. No. 4,374,237 describes a polyurethane sealant containing urethane prepolymers which have been further reacted with secondary amine compounds containing two silane groups. U.S. Pat. No. 4,687,533 describes a polyurethane sealant containing urethane prepolymers which contain silane groups which have been prepared by reacting a polyisocyanate having at least three isocyanate groups with less than an equivalent amount of an alkoxysilane having a terminal group containing active hydrogen atoms reactive with isocyanate groups to form an isocyanatosilane having at least two unreacted isocyanate groups. In a second step, the isocyanatosilane is mixed with additional polyisocyanate and the mixture is reacted with a polyol to form a polyurethane prepolymer having terminal isocyanato groups and pendant alkoxysilane groups.

However, when such sealants are used to bond glass substrates to painted substrates, such as for window installation in vehicle manufacturing, the lap shear strength of the bonded substrate may be less than desirable for safety or structural purposes. Consequently, a separate paint primer comprising a solution of one or more silanes is typically applied to a painted substrate prior to the application of the sealant in most vehicle assembly operations for bonding the windshield and the rear window. The use of a primer in assembly operations is undesirable in that it introduces an extra step, additional cost, the risk of marring the paint surface if dripped on an undesired location and exposes the assembly line operators to additional chemicals. It would be desirable to provide a polyurethane sealant which, when bonded to a painted substrate and cured, provides a bonded substrate with a higher lap shear strength, particularly when used in the absence of a paint primer.

SUMMARY OF THE INVENTION

In one aspect, this invention is a polyurethane sealant composition comprising (1) a urethane prepolymer having an isocyanate functionality of at least about 2.0 and a weight average molecular weight of at least about 2,000; and (2) a catalytic amount of (a) a substantially active hydrogen free glycol acid salt of a tertiary amine and an organo metallic compound, (b) a mixture of a substantially active hydrogen free glycol acid salt of a tertiary amine and an organo metallic compound and a second organometallic compound, or (c) a mixture of a dialkyl tin dicarboxylate with dimorpholinodialkyl ether or a di ((dialkylmorpholino)alkyl) ether.

In another embodiment, the polyurethane sealant composition further comprises (A) a silane, or (B) an adduct of an isocyanate reactive silane and a polyisocyanate, (C) the reaction product of (1) (a) an isocyanate reactive silane or (b) an adduct of an isocyanate reactive silane and a polyisocyanate with (2) (a) a polyisocyanate and an active hydrogen containing compound or (b) a polyurethane prepolymer which has free isocyanate moieties; which reaction product has an average of at least one silane group and at least one isocyanate group per molecule.

In another embodiment the invention is a method for bonding glass to a substrate which comprises contacting a sealant according to the invention with glass and another substrate with the sealant disposed between the glass and substrate and thereafter allowing the sealant to cure so as to bind the glass to the substrate.

The sealant composition of the invention is useful in bonding glass substrates to plastic, metal, fiberglass and composite substrates which may or may not be painted. It has been discovered to give unexpectedly high lap shear strength when no primer compositions have previously been applied to a painted plastic, metal, fiberglass or composite substrate.

DETAILED DESCRIPTION OF THE INVENTION

Suitable urethane prepolymers for use in preparing the composition of the invention include any compound having an average isocyanate functionality of at least about 2.0 and a molecular weight of at least about 2,000. Preferably, the average isocyanate functionality of the prepolymer is at least about 2.2, and is more preferably at least about 2.4. Preferably the isocyanate functionality is no greater than about 4.0, more preferably, no greater than about 3.5 and most preferably, no greater than abpout 3.0. Preferably, the weight average molecular weight of the prepolymer is at least about 2,500, and is more preferably at least about 3,000; and is preferably no greater than about 40,000, even more preferably, no greater than about 20,000, more preferably, no greater than about 15,000, and is most preferably, no greater than about 10,000. The prepolymer may be prepared by any suitable method, such as by reacting an isocyanate-reactive compound containing at least two isocyanate-reactive groups with an excess over stoichiometry of a polyisocyanate under reaction conditions sufficient to form the corresponding prepolymer.

Suitable polyisocyanates for use in preparing the prepolymer include any aliphatic, cycloaliphatic, araliphatic, heterocyclic or aromatic polyisocyanate, or mixture thereof. Preferably the polyisocyanates used have an average isocyanate functionality of at least about 2.0 and an equivalent weight of at least about 80. Preferably, the isocyanate functionality of the polyisocyanate is at least about 2.0, more preferably at least about 2.2, and is most preferably at least about 2.4; and is preferably no greater than about 4.0, more preferably no greater than about 3.5, and is most preferably no greater than about 3.0. Higher functionalities may also be used, but may cause excessive cross-linking, and result in an adhesive which is too viscous to handle and apply easily, and can cause the cured adhesive to be too brittle. Preferably, the equivalent weight of the polyisocyanate is at least about 100, more preferably at least about 110, and is most preferably at least about 120; and is preferably no greater than about 300, more preferably no greater than about 250, and is most preferably no greater than about 200. Preferably the isocyanate used is an aromatic isocyanate. More preferably the isocyanate is diphenyl methane diisocyanate.

Examples of useful polyisocyanates include ethylene diisocyanate, isophorone diisocyanate, bis(4-isocyanate cyclohexyl) methane, trimethyl hexamethylene diisocyanate, 1,4-tetramethylene diisocyanate, 1,6- hexamethylene diisocyanate, 1,12-dodecane diisocyanate, cyclobutane- 1,3-diisocyanate, cyclohexane-1,3- and 1,4-diisocyanate and mixtures of these isomers; 1-isocyanato3,3,5-trimethyl-5-isocyanato methyl cyclohexane (see e.g., German Auslegeschrift No. 1,202,785); 2,4-and 2,6-hexahydrotolylene diisocyanate and mixtures of these isomers, hexahydro 1,3-and/or 1,4-phenylene diisocyanate, perhydro2,5'- and/or 4,4'-diphenyl methane diisocyanate, 1,3- and 1,4-phenylene diisocyanate, 2,4'- and 2,6-tolylene diisocyanate and mixtures of these isomers, diphenylmethane2,4'- and/or 4,4'-diisocyanate, naphthylene-1,5-diisocyanate, triphenylmethane4,4',4"-triisocyanate, tetramethylxylene diisocyanates, polymeric derivatives of the previously described isocyanates, polyphenyl polymethylene polyisocyanates of the type obtained by condensing aniline with formaldehyde, followed by phosgenation and such as described, for example, in British Patents 874,430 and 848,671, perchlorinated aryl polyisocyanates of the type described in German Auslegeschrift 1,157,601, polyisocyanates containing carbodiimide groups of the type described in German Patent 1,092,007, diisocyanates of the type described in U.S. Pat. No. 3,492,330, polyisocyanates containing allophanate groups of the type described, for example, in British Patent 994,890, in Belgian Patent 761,626 and in published Dutch Patent Application No. 7,102,524, polyisocyanates containing isocyanurate groups of the type described in German Patents 1,022,789, 1,222,067 and 1,027,394 and in German Offenlegungsschrift 1,929,034 and 2,004,048, polyisocyanates containing urethane groups of the type described, for example, in Belgian Patent 752,261 or in U.S. Pat. No. 3,394,164, polyisocyanates containing acrylated urea groups as described in German Patent 1,230,778, polyisocyanates containing biuret groups of the type described, for example, in German Patent 1,101,392, in British Patent 889,050 and in French Patent 7,017,514, polyisocyanates obtained by telomerization reactions of the type described, for example, in Belgian Patent 723,640, polyisocyanates containing ester groups of the type described, for example, in British Patents 965,474 and 1,072,956, in U.S. Pat. No. 3,567,763 and in German Patent 1,231,688 and reaction products of the aforementioned isocyanates with acetals as described in German Patent 1,072,385. Preferred polyisocyanates include diphenylmethane4,4'-diisocyanate and polymeric derivatives thereof, isophorone diisocyanate, tetramethylxylene diisocyanate, 1,6-hexamethylene diisocyante and polymeric derivatives thereof, bis(4-isocyanatocylohexyl) methane, and trimethyl hexamethylene diisocyanate.

The term "isocyanate-reactive compound" as used herein includes any organic compound having at least two isocyanate-reactive moieties, such as a compound containing an active hydrogen moiety, or an iminofunctional compound. For the purposes of this invention, an active hydrogen containing moiety refers to a moiety containing a hydrogen atom which, because of its position in the molecule, displays significant activity according to the Zerewitnoff test described by Wohler in the Journal of the American Chemical Society, Vol. 49, p. 3181 (1927). Illustrative of such active hydrogen moieties are —COOH, —OH, —NH$_2$, —NH—, —CONH$_2$, —SH, and —CONH—. Preferable active hydrogen containing compounds include polyols, polyamines, polymercaptans and polyacids. Suitable imino-functional compounds are those which have at least one terminal imino group per molecule, such as are described, for example, in U.S. Pat. No. 4,910,279, which is hereby incorporated by reference in its entirety. Preferably, the isocyanate-reactive compound is a polyol, and is more preferably a polyether polyol.

Suitable polyols useful in the preparation of the prepolymers include, for example, polyether polyols, polyester polyols, poly(alkylene carbonate)polyols, hydroxyl-containing polythioethers, polymer polyols, and mixtures thereof. Polyether polyols are well-known in the art and include, for example, polyoxyethylene, polyoxypropylene, polyoxybutylene, and polytetramethylene ether diols and triols which are prepared by reacting an unsubstituted or halogen- or aromatic-substituted ethylene oxide or propylene oxide with an initiator compound containing two or more active hydrogen groups such as water, ammonia, a polyalcohol, or an amine. Such methods are described, for example, in U.S. Pat. Nos. 4,269,945; 4,218,543; and 4,374,210; which are hereby incorporated by reference in their entirety. In general, polyether polyols may be prepared by polymerizing alkylene oxides in the presence of an active hydrogen-containing initiator compound. Most preferred, however, are ethylene oxide-capped polyols prepared by reacting glycerin with propylene oxide, followed by reacting with ethylene oxide.

Suitable alkylene oxides include ethylene oxide, propylene oxide, butylene oxides, styrene oxide, epichlorohydrin, epibromohydrin, and mixtures thereof. Suitable initiator compounds include water, ethylene glycol, propylene glycol, butanediol, hexanediol, glycerin, trimethylol propane, pentaerythritol, hexanetriol, sorbitol, sucrose, hydroquinone, resorcinol, catechol, bisphenols, novolac resins, phosphoric acid, amines, and mixtures thereof.

Polyester polyols are also well-known in the art and may be prepared by reacting a polycarboxylic acid or anhydride thereof with a polyhydric alcohol. Examples of suitable polycarboxylic acids include succinic acid, adipic acid, suberic acid, azelaic acid, sebacic acid, phthalic acid, isophthalic acid, maleic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, maleic acid anhydride, glutaric acid anhydride, fumaric acid, an mixtures thereof. Examples of suitable polyhydric alcohols include ethylene glycols, propane diols, butane diols, 1,6-hexanediol, 1,8-octanediol, neopentylglycol, glycerol, trimethylol propane, pentaerythritol, quinitol, mannitol, sorbitol, methyl glycoside, diethylene glycol, triethylene glycol, tetraethylene glycol, polyethylene glycols, polypropylene glycols, and mixtures thereof.

Suitable polymer polyols include dispersions of polymers of vinyl monomers in a continuous polyol phase, particularly dispersions of styrene/acrylonitrile copolymers. Also useful are the so-called polyisocyanate polyaddition (PIPA) polyols (dispersions of polyurea-polyurethane particles in a polyol) and the polyurea dispersions in polyols (PHD polyols). Copolymer polyols of the vinyl type are described, for example, in U.S. Pat. Nos. 4,390,645, 4,463,107, 4,148, 840 and 4,574,137, all incorporated by reference.

Preferably, the isocyanate-reactive compound has a functionality of at least about 1.5, more preferably at least about 1.8, and is most preferably at least about 2.0; and is preferably no greater than about 4.0, more preferably no greater than about 3.5, and is most preferably no greater than about 3.0. Preferably, the equivalent weight of the isocyanate-reactive compound is at least about 200, more preferably at least about 500, and is more preferably at least about 1,000; and is preferably no greater than about 5,000, more preferably no greater than about 3,000, and is most preferably no greater than about 2,500.

The prepolymer may be prepared by any suitable method, such as bulk polymerization and solution polymerization.

The reaction to prepare the prepolymer is carried out under anhydrous conditions, preferably under an inert atmosphere such as a nitrogen blanket, to prevent cross-linking of the isocyanate groups by atmospheric moisture. The reaction is preferably carried out at a temperature between 0C and 150° C., more preferably between 25° C. and 80° C., until the residual isocyanate content determined by titration of a sample is very close to the desired theoretical value. The isocyanate content in the prepolymers is preferably in the range of about 0.1 percent to about 10 percent, more preferably in the range of about 1.5 percent to about 5.0 percent and most preferably in the range of about 1.8 percent to about 3.0 percent.

The prepolymer is present in the sealant composition in sufficient amount such that the sealant is capable of bonding glass to metal, plastic, fiberglass or composite substrates, preferably the substrates are painted and more preferably the substrates are painted with acid resistant paints. More preferably the polyurethane prepolymer is present in an amount of about 30 percent by weight or greater based on the weight of the sealant, even more preferably about 50 percent by weight or greater and most preferably about 70 percent by weight or greater. More preferably the polyurethane prepolymer is present in an amount of about 99.8 percent by weight or less based on the weight of the sealant and most preferably about 85 percent by weight or less.

In those embodiments where the sealant is used to bond glass to substrates coated with acid resistant paints it is desirable to have a silane present in some form. The silane may be blended with the prepolymer. In another embodiment the silane is a silane which has an active hydrogen atom which is reactive with an isocyanate. Preferably such silane is a mercapto-silane or an amino-silane and more preferably is a mercapto-trialkoxy-silane or an amino-trialkoxy silane. In one embodiment, the silane having, an active hydrogen atom reactive with isocyanate moieties, can be reacted with the terminal isocyanate moieties of the prepolymer. Such reaction products are disclosed in U.S. Pat. No. 4,374,237 and 4,345,053 relevant parts incorporated herein by reference In yet another embodiment, the silane having a reactive hydrogen moiety reactive with an isocyanate moiety can be reacted into the backbone of the prepolymer by reacting such silane with the starting materials during the preparation of the prepolymer. The process for the preparation of prepolymers containing silane in the backbone is disclosed in U.S. Pat. No. 4,625,012, relevant portions incorporated herein by reference. Such silane, having active hydrogen moieties, can be reacted with a polyisocyanate to form an adduct which is blended with the prepolymer reacted with a polyurethane prepolymer or reacted with a polyisocyanate and a compound having on average more than one moiety reactive with an isocyanate moiety. Preferably the adduct is a reaction product of a secondary amino- or mercapto-alkoxy silane and a polyisocyanate, the adduct having an average of at least one silane group and at least one isocyanate group per molecule (hereinafter "adduct"). Preferably the adduct has at least about 1.5 isocyanate groups and at least about one silane group per molecule, and most preferably has at least about two isocyanate groups and at least about one silane group per molecule. The adduct level in the sealant compositions is preferably in the range of about 0.5 percent to about 20 percent, more preferably in the range of about 1.0 percent to about 10 percent and most preferably in the range of about 2.0 percent to about 7 percent. The adduct may be prepared by any suitable method, such as, for example, by reacting an secondary amino- or mercapto-alkoxy silane with a polyisocyanate compound. Suitable polyisocyanates for use in preparing the adduct include those described above as suitable for use in preparing the prepolymer, particularly including isopherone diisocyanate, polymethylene polyphenylisocyanates, and aliphatic polyisocyanate such as hexamethylene diisocyanate. Preferably, the polyisocyanate is an aliphatic polyisocyanate and is most preferably an aliphatic polyisocyanate based on hexamethylene diisocyante with an equivalent weight of about 195. The polyisocyanate used to prepare the isocyanate silane adduct preferably has a molecular weight of less than about 2,000, more preferably less than about 1,000. Suitable organofunctional silanes include amino- or mercapto-alkoxysilanes of the formula:

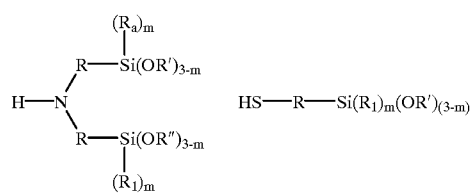

wherein R is a divalent organic group, preferably $C_{1-4}$ alkylene, R', R", $R_1$ and Ra are hydrogen or alkyl, preferably $C_{1-4}$ alkyl, m is an integer from 0 to 2. Examples of such compounds include: N,N-bis[(3-triethoxysilyl)propyl] amine; N,N-bis[(3-tripropoxy-silyl)propyl]amine; N-(3-trimethoxysilyl)propyl-3-[N-(3-trimethoxysilyl)-propylamino]propionamide; N-(3-triethoxysilyl)propyl-3-[N-3-triethoxysilyl)-propyl-amino]propionamide; N-(3-trimethoxysilyl)propyl-3-[N-3-triethoxysilyl)-propylamino] propionamide ; 3-trimethoxysilylpropyl 3-[N-(3-trimethoxysilyl)-propylamino]-2-methyl propionate; 3-triethoxysilylpropyl 3-[N-(3-triethoxysilyl)-propylamino]-2-methyl propionate; 3-trimethoxysilylpropyl 3-[N-(3-triethoxysilyl)-propylamino]-2-methyl propionate; and the like. Preferably the organofunctional silane is gamma-mercaptopropyl-trimethoxysilane (available as A189 from Union Carbide) or N,N'-bis((3-trimethoxysilyl) propyl)amine.

In preparing the adduct, the silane and the polyisocyanate reactants are preferably combined so that the ratio of isocyanate groups to secondary amine or mercapto groups in the reaction mixture to prepare the adduct is at least about 1.5, more preferably at least about 2.0, and most preferably at least about 2.5; and is preferably no greater than about 6.0, more preferably no greater than about 5.5, and most preferably no greater than about 5.0. The adduct may be prepared by any suitable method, such as bulk or solution polymerization. The reaction between the polyisocyanate and the organofunctional silane is preferably carried out under anhydrous conditions, preferably under an inert atmosphere such as a nitrogen blanket, to prevent premature hydrolysis of the alkoxysilane groups and/or crosslinking of the isocyanate groups by atmospheric moisture. The polyisocyanate and alkoxysilane are preferably reacted under anhydrous conditions at a temperature between room temperature (about 20° C.) and about 80° C. Depending on the reagents, an exotherm may develop so that no external heating is required. Indeed, cooling may be necessary. The reaction is generally complete within two hours and may be catalyzed with a tin catalyst, suitably a tin salt such as a tin carboxylate, if desired. The reaction is suitably carried out in heat or in an inert liquid diluent or carrier. While any of the conventional inert organic solvents such as the benzene, toluene, xylene and other hydrocarbons or halohydrocarbons can be employed, it is preferable to use a compound having plasticizing properties, since the use of a plasticizer avoids the need for isolating the active reaction products from the reaction mixtures.

The reactions to prepare the prepolymer and the adduct may be carried out in the presence of urethane catalysts. Examples of such include the stannous salts of carboxylic acids, such as stannous octoate, stannous oleate, stannous acetate, and stannous laurate. Also, dialkyltin dicarboxylates such as dibutyltin dilaurate and dibutyltin diacetate are known in the art as urethane catalysts, as are tertiary amines and tin mercaptides. Preferably, the reaction to prepare the prepolymer is catalyzed by stannous octoate. The amount of catalyst employed is generally between about 0.005 and about 5 percent by weight of the mixture catalyzed, depending on the nature of the isocyanate.

In one embodiment the sealant composition of the invention further comprises a catalyst composition an active hydrogen free glycol acid salt of a tertiary amine and an organometallic compound. The tertiary amine is any tertiary amine which complexes with an organometallic compound and preferably has a pH of about 8 to about 12, and most preferably has a pH of about 8 to about 10. Preferred tertiary amines include triethylene diamine and 1,8 diazabicyclo[5,4,0]undecene. The organometallic compound can be any organometallic compound which is known as a catalyst in polyurethane reactions. Preferred organometallic compounds include dialkyl tin dicarboxylates, such as 1,1-dibutyltin diacetate and 1,1-dimethyltin dilaurate. A preferred catalyst is an active hydrogen free glycol salt of triethylenediamine and 1,1-dibutyltin diacetate. The glycol salt of triethylenediamine and 1,1-dibutyltin diacetate is available from Air Products as DABCO DC2 catalyst. The glycol salt is modified by reacting it with a compound which reacts with active hydrogen atoms to neutralize them, preferably a polyisocyanate. Preferably the isocyanate is aliphatic and more preferably is nonsymmetric. Preferably the polyisocyanate and the salt are reacted in a solvent and plasticizer and in stoichiometric amounts, although an excess of the isocyanate may be used. Useful solvents include aromatic hydrocarbons, such as toluene and xylene. Plasticizers as disclosed herein may be used. Upon contacting the dissolved salt with the isocyanate the mixture exotherms. It may be exposed to heat for a period of time, and temperatures up to about 100° C. may be used. Preferably a temperature of about 60° C. to about 85° C. is used. The mixture is reacted until the active hydrogen atoms have been substantially removed. Substantially removed means all but a trace amount of the active hydrogen atoms have been removed. The catalyst composition may be used in an amount of about 0.05 percent by weight or greater based on the weight of the sealant and preferably 0.2 percent by weight or greater. The catalyst may preferably be used in an amount of about 4.0 percent by weight or less, based on the weight of the sealant, more preferably 1.0 percent by weight and most preferably 0.4 percent by weight or less.

The sealant composition of the invention also preferably contains a second catalyst which has good stability in the absence of atmospheric moisture, but which has a rapid cure rate in the presence of atmospheric moisture, such as an organo tin catalyst, a dimorpholinodialkyl ether, a di((dialkylmorpholino)alkyl) ether or a mixture thereof. A preferred dimorpholinodialkyl ether is dimorpholinodiethyl ether. A preferred di((dialkylmorpholino)alkyl) ether is (di-(2-(3,5-dimethylmorpholino)ethyl)ether). The dimorpholinodialkyl ether or di((dialkylmorpholino)alkyl) ether when employed, are preferably employed in an amount, based on the weight of the sealant, of about 0.01 percent by weight or greater based on the sealant, more preferably about 0.05 percent by weight or greater, even more preferably about 0.1 percent by weight or greater and most preferably about 0.2 percent by weight or greater and about 2.0 percent by weight or less, more preferably 1.75 percent by weight or less, even more preferably 1.0 percent by weight or less and most preferably 0.4 percent by weight or less. The organotin catalyst is preferably a dialkyltin dicarboxylate or a dialkyltin dimercaptide. The dialkyltin dicarboxylate preferably corresponds to the formula $(R^2OC(O))_2$—Sn—$(R^3)_2$ wherein $R^2$ and $R^3$ are independently in each occurrence a $C_{1-10}$ alkyl, preferably a $C_{1-3}$ alkyl and most preferably a methyl. Dialkyl tin dicarboxylates with lower total carbon atoms are preferred as they are more active catalysts in the compositions of the invention. The preferred dialkyl dicarboxylates include 1,1-dimethyltin dilaurate, 1,1-dibutyltin diacetate and 1,1-dimethyl dimaleate. The organo tin catalyst is present in an amount of about 60 parts per million or greater based on the weight of the sealant, more preferably 120 parts by million or greater. The organo tin catalyst is present in an amount of about 1.0 percent or less based on the weight of the sealant, more preferably 0.5 percent by weight or less and most preferably 0.1 percent by weight or less.

In another embodiment of the invention the catalyst is a mixture of an organotin catalyst and a dimorpholinodialkyl ether or a di((dialkylmorpholino)alkyl) ether.

For formulating sealant compositions, the prepolymer and the adduct, if present, are combined, preferably with fillers and additives known in the prior art for use in elastomeric compositions. By the addition of such materials, physical properties such as viscosity, flow rate, sag, and the like can be modified. However, to prevent premature hydrolysis of the moisture sensitive groups of the polymer, the filler should be thoroughly dried before admixture therewith. Exemplary filler materials and additives include materials such as carbon black, titanium dioxide, clays, calcium carbonate, surface treated silicas, ultraviolet stabilizers, antioxidants, and the like. This list, however, is not comprehensive and is given merely as illustrative. The fillers are preferably present in an amount of about 15 percent by weight or greater based on the amount of the sealant. The fillers are preferably present in an amount of about 70 percent by weight or less based on the sealant, more preferably 50 percent by weight or less and even more preferably 30 percent by weight or less.

The amount of silane present is that amount which enhances the adhesion of the adhesive to the painted surface without the need for a primer. The amount of silane is preferably, about 0.1 percent by weight or greater based on the weight of the sealant and most preferably, 1.0 percent by weight or greater. The amount of silane used is preferably, 10 percent by weight or greater or less and most preferably, 2.0 percent by weight or less.

The sealant composition also preferably contains one or more plasticizers or solvents to modify theological properties to a desired consistency. Such materials should be free of water, inert to isocyanate groups, and compatible with the polymer. Such material may be added to the reaction mixtures for preparing the prepolymer or the adduct, or to the mixture for preparing the final sealant composition, but is preferably added to the reaction mixtures for preparing the prepolymer and the adduct, so that such mixtures may be more easily mixed and handled. Suitable plasticizers and solvents are well-known in the art and include dioctyl phthalate, dibutyl phthalate, a partially hydrogenated terpene commercially available as "HB-40", trioctyl phosphate, epoxy plasticizers, toluene-sulfamide, chloroparaffins, adipic acid esters, castor oil, xylene, 1-methyl-2-pyrrolidinone and toluene. The amount of plasticizer used is that amount sufficient to give the desired rheological properties and disperse the components in the sealant composition. Preferably the plasticizer is present in an amount of about 0 percent by weight or greater, more preferably 5 percent by weight or greater and most preferably 10 percent by weight or greater. The plasticizer is preferably present in an amount of about 45 percent by weight or less and about 40 percent by weight or less and most preferably 20 parts by weight or less.

The sealant composition of this invention may be formulated by blending the components together using means well-known in the art. Generally the components are blended in a suitable mixer. Such blending is preferably conducted in an inert atmosphere and atmospheric moisture to prevent premature reaction. It may be advantageous to add any plasticizers to the reaction mixture for preparing the isocyanate containing prepolymer so that such mixture may be easily mixed and handled. Alternatively, the plasticizers can be added during blending of all the components. Once the sealant composition is formulated, it is packaged in a suitable container such that it is protected from atmospheric moisture. Contact with atmospheric moisture could result in premature crosslinking of the polyurethane prepolymer-containing isocyanate groups.

The sealant composition of the invention is used to bond porous and nonporous substrates together. The sealant composition is applied to a substrate and the adhesive on the first substrate is thereafter contacted with a second substrate. Thereafter the adhesive is exposed to curing conditions. In a preferred embodiment one substrate is glass and the other substrate is a plastic, metal, fiberglass or composite substrate which may optionally be painted. This method is especially effective for substrates painted with an acid resistant paint. In preferred embodiments, the surfaces to which the adhesive is applied are cleaned prior to application, see for example U.S. Pat. Nos. 4,525,511, 3,707,521 and 3,779,794. Generally the sealants of the invention are applied at ambient temperature in the presence of atmospheric moisture. Exposure to atmospheric moisture is sufficient to result in curing of the sealant. Curing may be further accelerated by applying heat to the curing sealant by means of convection heat, or microwave heating. Preferably the sealant of the invention is formulated to provide a working time of 6 minutes or greater more preferably 10 minutes or greater. Preferably the working time is 15 minutes or less and more preferably 12 minutes or less.

Molecular weights as described herein are determined according to the following procedure: determined using the Waters Model 590 Gel Permeation Chromatograph. This unit is connected to a multiwavelength detector and a differential refractometer to measure the elution volume. A column of styrogel is used for the size exclusion and it can determine molecular weights from 250 to 50,000. The molecular weight of the prepolymer is then determined by measuring the elution volume through this column using tetrahydrofuran as the eluting solvent. The molecular weight is then calculated from a calibration curve of molecular weight vs. elution volume obtained from a polystyrene polyethylene glycol column. The quoted molecular weights are weight average molecular weights unless otherwise specified.

In reference to polyurethane prepolymers, average isocyanate functionality is determined according to the following formula, $$\frac{\begin{array}{c}(\text{moles diol-NCO adduct} \times \text{diol-NCO functionality}) + \\ (\text{moles triol-NCO adduct} \times \text{triol-NCO functionality}) + \\ (\text{moles excess polyisocyanate monomer} \times \text{its functionality})\end{array}}{\begin{array}{c}\text{moles diol-NCO adduct} + \text{moles triol-NCO adduct} + \\ \text{moles excess polyisocyanate monomer}\end{array}}$$

wherein moles excess polyisocyanate monomer are calculated according to the following formula, moles of isocyanate−(2× moles of diol+3× moles of triol)

and the moles of isocyanate, diol and triol are based on the amount of each in the starting formulation.

The theoretical average molecular weight of the prepolymer is calculated as equal to the average isocyanate functionality times the isocyanate equivalent weight of the prepolymer.

Functionality of the raw material is generally disclosed by the raw material supplier. It can be determined empirically by means of titrating the polyol or isocyanate to determine the average number functional group per molecule. One skilled in the art knows how to determine the functionality based on data developed by titration.

EXAMPLE 1

A polyether polyurethane prepolymer was prepared by thoroughly mixing 386 grams of a polyoxypropylene diol having an average molecular weight of 2000 and 559 grams of polyoxypropylene triol having an average molecular weight of 4500, in a 2-liter resin kettle equipped with a mechanical agitator, a nitrogen inlet adapter and a thermometer. Under nitrogen purge, the mixture was heated to 50° C. 170 grams of molten diphenylene methane 4, 4' diisocyanate were added to the mixture and the mixture thoroughly mixed. Then 0.1 gram of stannous octoate was introduced and the mixture was mixed for two hours. Finally, 484 grams of alkyl phthalate plasticizer and 16 grams of diethyl malonate were added to the mixture. The resulting prepolymer had an isocyanate content of 1.47 percent by weight.

EXAMPLE 2

A silane adduct formed between a secondary amino bis-alkoxysilane and a poly-isocyanate was prepared by charging and then thoroughly mixing 60 grams of alkyl phthalate plasticizer and 150 grams ( 0.263 mol ) of "Desmodur N-100 (a reaction product of three moles of hexamethylene diisocyanate with one mole of water, supplied by Miles Inc.) in a reactor equipped with a mechanical agitator, a thermometer, a nitrogen inlet tube. To the above mixture, 90 grams (0.263 mole) of N,N'-bis((3-trimethoxysilyl)-propyl)-amine (TMSPA) were added, the whole mixture was mixed for 30 minutes. The adduct mixture had an isocyanate content of 7.1 percent by weight.

EXAMPLE 3

A polyurethane prepolymer containing pendant silane groups was prepared by copolymerizing a diisocyanate, a polyether diol, a polyether triol, and a silane adduct. 200 grams of a polypropylene ether diol having an average molecular weight of 2000, 272 grams of a polypropylene ether triol having an average molecular weight of 4500 and 15 grams of alkyl phthalate plasticizer were mixed and heated to 50° C. in a reaction kettle under nitrogen. 45 grams of the silane adduct in Example 2, and 78 grams of molten diphenylene methane 4,4' diisocyanate were added to the kettle and thoroughly mixed. To the above mixture, 0.03 gram of stannous octoate catalyst was added. Mixing was continued for 2 hours. 282 grams of alkylphthalate and 9 grams of diethyl malonate were added and uniformly mixed. The prepolymer had an isocyanate content of 1.3 percent by weight.

EXAMPLE 4

A commercial available catalyst containing glycol as a solvent was treated with a diisocyanate compound to react away glycol, by first dissolving 10.8 grams of Dabco DC-2 (delay-action, amine-based catalyst, supplied by Air Products and Chemicals, Inc. ) in the mixture of 27.7 of toluene, 9.2 grams of N-ethyl toluene sulfonamide and 21.6 grams of diethyl malonate in a reactor equipped with a mechanical agitator, a thermometer, a nitrogen inlet tube. And then 30.8 grams of Vestanat TMDI (trimethyl hexamethylene diisocyante supplied by Huls America, Inc.) was added under agitation. After exothem subsided, the mixture was heated at 80° C. for 6 hours. The final mixture was a liquid of light orange color and had zero percent isocyanate content by NCO titration.

EXAMPLE 5

A moisture curable sealant composition was prepared under anhydrous conditions by first degassing under agitation the mixture of 1089 grams of the prepolymer of Example 1, and 15 grams of N,N' bis((3-trimethoxysilyl) propyl) amine in a planetary mixer for 30 minutes. At this point, all the aminosilane was fully reacted with some isocyanate groups on the prepolymer. Then, to the above mixture, 65 grams of Desmodur N-3300 (an aliphatic polyisocyanate resin based on hexarnethylene diisocyanate, supplied by Bayer USA Inc.) was charged and mixed for 10 minutes. Subsequently, 450 grams of dried carbon black was added, and mixed for 25 minutes under the reduced pressure of 30 inches of mercury. Finally, 14 grams of modified DABCO DC-2 of Example 4, was added and mixed for 10 minutes under the reduced pressure. The compounded sealant was filled into sealant tubes.

The following are tests used for the prepared sealants:
Quick Knife Adhesion Test:

A 6.3 mm (width)×6.3 mm (height)×76.2 mm (length) size sealant bead is placed on 101.6 mm×101.6 mm piece of an acid resistant paint panel and the assembly is cured for a specific time in the condition of 23° C. and 50 percent relative humidity. The cured bead is then cut with a razor blade through to the painted surface at 45 angle while pulling back the end of the bead at 180 angle. Notches are cut every 3 mm on the painted surface. The degree of adhesion is evaluated as adhesive failure (AF) and/or cohesive failure (CF). In case of adhesive failure, the cured bead can be separated from the painted surface, while in cohesive failure, separation occurs within the sealant bead as a result of cutting and pulling. The tested paint substrate can be used as supplied, or treated by wiping with isopropanol (IPA) or naphtha (NP). For the sealant of the invention, adhesion of a sealant develops sooner to the treated substrate than to the untreated one.
Lap Shear Test:

A sealant approximately 6.3 mm wide by 8 mm high is applied along the width of the glass and approximately 6 mm to 12 mm from the primed end. The paint substrate is immediately placed on the sealant and the sample is allowed to cure at the condition of the 23° C. and 50 percent relative humidity for 5 days. The sample was then pulled at a rate of 1 inch/minute (2.5 cm/min)with an Instron Tester.
Environmental Tests:

Short term environmental tests include four weeks in the condition of 24 C, 50 percent RH, four weeks in a 90° C. oven, and ten days in 32° C. water. Samples also are subjected to weatherability tests according to SAE J 1960 and SAE J 1885.

Quick Adhesion Test:

A 4×¼ inch (10.1×0.6 cm) bead of sealant is extruded from a sealant tube on to a primed glass plate. A paint substrate is immediately placed on the top of the sealant bead. This assembly is allowed to cure at the 23° C. and 50 percent relative humidity condition for a specific length of time and then the two substrates were separated by pulling in a plane perpendicular to the plane of the sealant bead at 10 inches per minute (25.4 cm per minute). The curing rate is recorded in pounds per square inch (kilopascals) at the elapsed time after assembly.

The stability of the sealant on storage is evaluated by determining the flow rates of a sealant before and after aging at 130° F. (54° C.) for three days. The press flow is determined as the time in seconds required to extrude 20 grams of the sealant through an orifice 0.157 inch (0.4 cm) in diameter under a pressure of 80 pounds per square inch (551 kPa). Percent growth in press flow after aging will indicate the stability of the sealant on storage.

The sealant in the Example 5 had a very good accelerated storage stability as shown in press flows of 19 and 20 seconds respectively before and after aging at 130° F. (54° F.) for 3 days. Quick knife adhesion test showed that the sealant adhered in one day to the IPA wiped acid resistant paint and in 2 days to the untreated one. In lap shear testing, the sealant developed an average lap shear strength of 544 psi (3748 kPa) on both the treated and untreated paint substrates after 5 day cure at the condition of 23° C. and 50 percent R.H. The cured sealant produced 168 psi (1157 kpa)of tear strength and 1085 psi (7476 kPa) of tensile strength and 270 percent elongation at break. The cure rate by the Quick adhesion test, for this sealant were: 4 psi (28 kPa) at 1.5 hour, 24 psi (165 kPa) at 3 hours and 84 psi (579 kPa) at 6 hours.

EXAMPLES 6

This sealant has the same composition as the sealant in the Example 5 except that a combination of 6 grams of the modified catalyst in the Example 4 and 5 grams of dimorpholinodiethyl ether (DMDEE) was used instead of 14 grams of the modified catalyst alone. The cured sealant has similar adhesion and physical properties as the sealant in Example 5. The cure rates by the Quick adhesion test at the condition of 23° C. and 50 percent RH, for this sealant were: 23 psi (158 kPa) at 1.5 hour, 63 psi (434 kPa) at 3 hours and 100 psi (689 kPa) at 6 hours. When exposed to the SAE J 1960 condition, the cured lap shear samples prepared from this material using glass primer on the glass side and no paint primer on the IPA wiped paint substrate, exhibited an average lap shear strength of 525 psi (3617 kPa), 100 percent cohesive failure within the sealant after 2,000 hours of exposure.

EXAMPLES 7

Additional moisture curable sealants were also prepared in the same fashion as described in Example 5. Their compositions and adhesion properties by Quick Knife Adhesion to acid resistant paint are tabulated below.

TABLE 1

| Ingredient (% by weight) | Ex-7 | Ex-8 | Ex-9 | Ex-10 | Ex-11 | Ex-12 |
|---|---|---|---|---|---|---|
| Prepolymer in Example 1 | 1021 | 1089 | — | 1089 | 1089 | 1021 |
| Prepolymer in Example 3 | — | — | 1115 | — | — | — |
| TMSPA | 15 | 5 | — | 17 | 15 | 15 |
| Silane Adduct in Example 2 | 55 | — | — | — | — | 55 |
| Desmodur N-3300 | — | 13 | 45 | 68 | — | 64 |
| PAPI 2020 | — | 35 | — | — | — | — |
| Carbon Black | 500 | 450 | 450 | 375 | 450 | 500 |
| Calcium Carbonate | — | — | — | 274 | — | — |
| Catalyst in Example 4 | 18 | 35 | 6 | 7 | 6 | 6 |
| Bismuth Octoate | — | — | — | — | — | — |
| Stannous Octoate | — | — | — | — | — | — |
| DMDEE | 5 | — | 5 | 6 | 5 | 5 |
| 1-Methyl-2-pyrrolidinone | — | — | — | — | — | — |
| Alkyl Phthalate Plasticizer | 10 | — | — | — | — | — |
| Total | 1624 | 1637 | 1621 | 1836 | 1565 | 1666 |
| Days required to have adhesion to substrate | | | | | | |
| with wipe | 1 | 5 | 1 | 1 | 6 | 2 |
| without wipe | 2 | 5 | 2 | 1 | >10 | 4 |

TABLE 2

| Ingredient (% by weight) | Ex-13 | Ex-14 | Ex-15 | Ex-16 | Ex-17 | Ex-18 | Ex-19 | Ex-20 |
|---|---|---|---|---|---|---|---|---|
| Prepolymer in Example 1 | 1089 | 1089 | 1089 | 1089 | 1089 | 1089 | 1089 | 938 |
| TMSPA | 15 | 15 | 15 | 15 | 15 | 15 | 15 | — |
| Silane Adduct in Example 2 | — | — | — | — | — | — | — | 165 |
| Desmodur N-3300 | 71 | 71 | 71 | 71 | 71 | 65 | 65 | — |
| Catalyst in Example 4 | 6 | 6 | 6 | — | 6 | — | — | — |
| Bismuth Octoate | — | — | — | — | — | 8 | — | — |
| Stannous Octoate | — | — | — | — | — | — | 2 | — |
| DMDEE | 3 | 5 | 5 | 5 | 5 | — | — | 5 |
| 1,1,Dimethyl Tin Dilaurate | — | — | — | 0.2 | 0.2 | — | — | — |
| Alkylphthalate Plasticizer | — | — | — | 1.8 | 1.8 | — | — | 35 |
| 1,1,Dibutyl Tin Diacetate | 2 | — | — | — | — | — | — | — |
| 1,1,Dimethyl Tin Mercaptide | — | — | 2 | — | — | — | — | — |
| 1-Methyl-2-pyrrolidinone | — | — | — | — | — | 20 | 20 | — |
| Dimethyl tin dimaleate | — | 2 | — | — | — | — | — | — |
| Carbon Black | 493 | 493 | 493 | 493 | 493 | 450 | 450 | 500 |
| Total | 1679 | 1681 | 1681 | 1675 | 1681 | 1647 | 1641 | 1643 |
| Days required to have adhesion to substrate | | | | | | | | |
| with wipe | 1 | 1 | 1 | 1 | 1 | no adhesion | no adhesion | no adhesion |
| without wipe | 2 | 2 | 2 | 1 | 1 | no adhesion | no adhesion | no adhesion |

What is claimed is:

1. A sealant composition comprising (1) a urethane prepolymer having an isocyanate functionality of at least about 2.0 and a weight average molecular weight of at least about 2,000; and (2) a catalytic amount of a substantially active hydrogen free glycol acid salt of a tertiary amine and an organo metallic compound.

2. The sealant composition of claim 1 wherein the catalyst further comprises a second organo metallic compound, a dimorpholino dialkyl ether, a di((dialkylmorpholino)alkyl) ether or a mixture thereof.

3. The sealant composition of claim 1 wherein the substantially active hydrogen free glycol acid salt of tertiary amine and the organometallic compound is the reaction product of a polyisocyanate and a glycol acid salt of tertiary amine and an organometallic compound.

4. The sealant composition of claim 1 wherein the tertiary amine has a pH of about 8 to about 10.

5. The sealant composition of claim 1 wherein the organo tin compound is a dialkyl tin dicarboxylate.

6. The sealant composition of claim 5 wherein the dialkyl tin dicarboxylate corresponds to the formula $(R^2OC(O))_2$—Sn—$(R^3)_2$ wherein $R^2$ and $R^3$ are independently in each occurrence a $C_{1-10}$.

7. The sealant composition of claim 1 wherein the isocyanate content of the prepolymer is in the range of from about 1.5 percent to about 5.0 percent.

8. The sealant according to claim 1 wherein the tertiary amine is triethylene diamine or 1,8 diazabicyclo[5,4,0]undecene.

9. The sealant according to claim 1 wherein the organometallic compound is 1,1-dimethyltin dilaurate, 1,1-dibutyltin diacetate, 1,1-dimethyl dimaleate or a dialkyltin dimercaptide.

10. A method for bonding glass to a substrate which comprises contacting a sealant according to claim 1 with glass and another substrate with the sealant disposed between the glass and substrate and thereafter allowing the sealant to cure so as to bind the glass to the substrate.

11. A method according to claim 10 wherein the substrate is metal, plastic or a composite which is coated with an acid resistant paint.

12. A method according to claim 10 wherein the substantially active hydrogen free glycol acid salt of tertiary amine and the organometallic compound is the reaction product of a polyisocyanate and a glycol acid salt of tertiary amine and an organometallic compound.

13. The method of claim 10 wherein the tertiary amine has a pH of about 8 to about 10.

14. The method of claim 10 wherein the organo tin compound is a dialkyl tin dicarboxylate.

15. The method of claim 10 wherein the dialkyl tin dicarboxylate corresponds to the formula $(R^2OC(O))_2$—Sn—$(R^3)_2$ wherein $R^2$ and $R^3$ are independently in each occurrence a $C_{1-10}$ alkyl.

16. A sealant composition comprising (1) a urethane prepolymer having an isocyanate functionality of at least about 2.0 and a weight average molecular weight of at least about 2,000; (2) a catalytic amount of a substantially active hydrogen free glycol acid salt of a tertiary amine and an organo metallic compound.

17. The sealant composition of claim 16 wherein the catalyst further comprises a second organo metallic compound, a dimorpholino dialkyl ether, a di((dialkylmorpholino)alkyl) ether or a mixture thereof.

* * * * *